(12) United States Patent
Beale et al.

(10) Patent No.: US 11,736,242 B2
(45) Date of Patent: Aug. 22, 2023

(54) COMMUNICATION DEVICE, INFRASTRUCTURE EQUIPMENT AND METHODS

(71) Applicant: Sony Corporation, Tokyo (JP)

(72) Inventors: Martin Warwick Beale, Basingstoke (GB); Samuel Asangbeng Atungsiri, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 212 days.

(21) Appl. No.: 17/215,405

(22) Filed: Mar. 29, 2021

(65) Prior Publication Data

US 2021/0218508 A1 Jul. 15, 2021

Related U.S. Application Data

(63) Continuation of application No. 16/476,306, filed as application No. PCT/EP2017/083875 on Dec. 20, 2017, now Pat. No. 10,965,409.

(30) Foreign Application Priority Data

Jan. 9, 2017 (EP) .................................... 17150730

(51) Int. Cl.
*H04L 1/20* (2006.01)
*H04L 1/00* (2006.01)
(Continued)

(52) U.S. Cl.
CPC ............ *H04L 1/206* (2013.01); *H04L 1/0045* (2013.01); *H04L 1/1858* (2013.01);
(Continued)

(58) Field of Classification Search
CPC ....... H04L 1/206; H04L 1/0045; H04L 1/189; H04L 1/1864; H04L 25/0224;
(Continued)

(56) References Cited

U.S. PATENT DOCUMENTS

2002/0080719 A1  6/2002  Parkvall
2003/0045288 A1  3/2003  Luschi
(Continued)

FOREIGN PATENT DOCUMENTS

WO  2014/018052 A1  1/2014
WO  2016/113177 A1  7/2016

OTHER PUBLICATIONS

International Search Report and Written Opinion dated Jun. 14, 2018 for PCT/EP2017/083875 filed on Dec. 20, 2017, 21 pages.
(Continued)

*Primary Examiner* — Chi Ho A Lee
(74) *Attorney, Agent, or Firm* — Xsensus LLP

(57) ABSTRACT

A communications device includes receiver circuitry, transmitter circuitry, and controller circuitry controlling the transmitter circuitry and the receiver circuitry to receive data in accordance with an automatic repeat request (ARQ) type protocol in which the data is received as a plurality of encoded data packets encoded with an error correction code and the transmitter circuitry transmits a feedback signal depending on whether each of the data encoded packets is estimated as having been decoded successfully by the receiver circuitry. The controller circuitry is configured to evaluate a quality measure of each encoded data packet and in response to the evaluated quality measure to transmit an early indication of the feedback signal to the wireless communications network, before the encoded data packet has been decoded by the error correction decoder.

4 Claims, 8 Drawing Sheets

(51) Int. Cl.
   *H04L 1/1829* (2023.01)
   *H04L 25/02* (2006.01)
   *H04W 72/23* (2023.01)

(52) U.S. Cl.
   CPC ........ *H04L 1/1864* (2013.01); *H04L 25/0224* (2013.01); *H04W 72/23* (2023.01)

(58) Field of Classification Search
   CPC ......... H04L 1/1858; H04L 2025/03414; H04L 25/03414; H04L 25/0212; H04W 72/042
   See application file for complete search history.

(56) References Cited

U.S. PATENT DOCUMENTS

| | | |
|---|---|---|
| 2004/0131084 A1 | 7/2004 | Bing |
| 2005/0063344 A1 | 3/2005 | Winzell |
| 2007/0081483 A1 | 4/2007 | Jang |
| 2008/0101285 A1 | 5/2008 | Venkatachalam |
| 2009/0016265 A1 | 1/2009 | Katayama |
| 2009/0034635 A1 | 2/2009 | Golitschek Edler Von Elbwart |
| 2011/0113299 A1 | 5/2011 | Power |
| 2012/0147759 A1 | 6/2012 | Ratnakar |
| 2014/0229519 A1 | 8/2014 | Dietrich |
| 2019/0174449 A1 | 6/2019 | Shan |
| 2019/0281587 A1 | 9/2019 | Zhang |
| 2020/0220705 A1 | 7/2020 | Khandani |

OTHER PUBLICATIONS

ETSI, "Digital Video Broadcasting (DVB); Frame structure channel coding and modulation for a second generation digital terrestrial television broadcasting system (DVB-T2)", Final draft ETSI EN 302 755 V1.3.1, Nov. 2011, pp. 1-189.

Longoni et al., "Radio Access Network Architecture", WCDMA for UMTS—HSPA Evolution and LTE, 2007, pp. 67-90.

NTT Docomo, "New SID Proposal: Study on New Radio Access Technology", 3GPP TSG RAN Meeting No. 71 RP-160671, Göteborg, Sweden, Mar. 7-10, 2016, 8 pages.

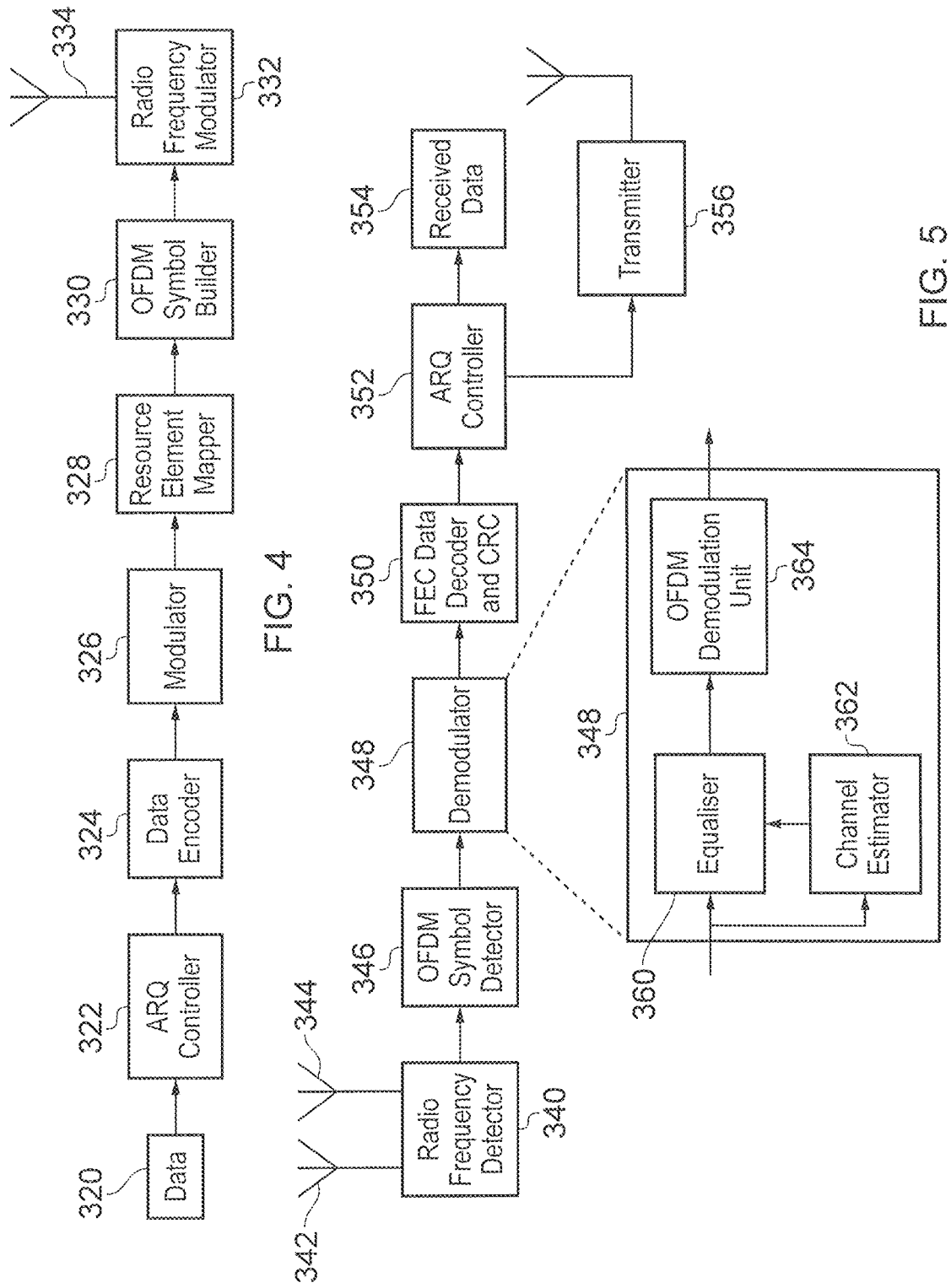

PDSCH carrying URLLC payload is scheduled using a DCI transmitted on PDCCH

URLLC latency when HARQ re-transmissions are applied

Transmission format of URLLC packet according to an aspect of the invention

Example timeline of decoding transmission format according to the invention

COMMUNICATION DEVICE, INFRASTRUCTURE EQUIPMENT AND METHODS

CROSS-REFERENCE TO RELATED APPLICATIONS

The present application is a Continuation of U.S. application Ser. No. 16/476,306, filed Jul. 8, 2019, now U.S. Pat. No. 10,965,409, which is a National Stage Application claiming priority to PCT filing PCT/EP2017/083875, filed Dec. 20, 2017, which claims priority to EP 17150730.4, filed Jan. 9, 2017, the entire contents of each are incorporated herein by reference.

TECHNICAL FIELD OF THE DISCLOSURE

The present disclosure relates to communications devices configured to transmit data to a wireless communications network and to receive data from the wireless communications network via a wireless access interface using a transmitter and a receiver respectively, which include an arrangement for providing a feedback message such as an ACK or NACK which may be part of an automatic repeat request (ARQ) type protocol. The present invention also relates to methods of communicating using communications devices, wireless communications networks, infrastructure equipment and methods.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication (MTC) devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficient connectivity for a wide range of devices associated with different applications with different characteristic data traffic profiles, resulting in different devices having different operating characteristics and/or requirements.

One example of such a new service is referred to as Ultra Reliable Low Latency Communications (URLLC) services, which as its name suggests requires that a data unit or packet be communicated with a high reliability with a low communications delay. URLLC type services therefore represent a challenging example for both LTE type communications systems and 5G/NR communications systems.

SUMMARY OF THE DISCLOSURE

Embodiments of the present technique can provide a communications device configured to receive data from a wireless communications network. The communications device comprises receiver circuitry configured to receive signals transmitted via a wireless access interface provided by the wireless communications network, transmitter circuitry configured to transmit signals via the wireless access to the wireless communications network, and controller circuitry configured to control the transmitter circuitry and the receiver circuitry to receive the data represented as signals from the wireless access interface in accordance with an automatic repeat request, ARQ, type protocol in which the data is received as a plurality of encoded data packets. The encoded data packets have been encoded with an error correction code and the transmitter circuitry is configured to transmit a feedback signal depending on whether each of the data encoded packets is estimated as having been decoded successfully by the receiver circuitry. The controller circuitry is configured to evaluate a quality measure of each encoded data packet and in response to the evaluated quality measure to transmit an early indication of the feedback signal to the wireless network, before the encoded data packet has been decoded by the error correction decoder.

Embodiments of the present technique can provide an improvement to services which utilise feedback from a receiver to a transmitter to indicate whether a data packet has been determined to have been received correctly or not, which is used by the transmitter for example to re-transmit or to stop a repeated transmission. Such an arrangement may be in accordance with an ARQ-type protocol of which there are several examples. A quality measure which is representative of a likelihood of correctly detecting and recovering the data carried by an encoded data packet, which is derived from measureable performance characteristics of the receiver, can be used by the receiver to generate a feedback signal representing an early indication of whether or not the data from the encoded data packet can be correctly decoded. By generating the quality measure and using the quality measure to evaluate whether the data can be recovered from an encoded data packet an early indication can be provided to the transmitter to take appropriate action. This might be for example to start preparation and to re-transmit the encoded data packet or to stop re-transmission if the feedback signal is positive according to an ARQ protocol. As a result a transmission time of an encoded data packet can be reduced and/or a reduction in communications resource usage can be achieved.

Embodiments of the present technique can therefore be used to improve a URLLC type communications service.

In other examples, a plurality of quality measures may be used, which are generated from the same or different processes of the receiver, which are each evaluated to determine whether the encoded data packet has been successfully received or not. Accordingly, a "running commentary" can be used to generate different feedback events to provide an earliest possible indication that the encoded data packet has been received or not.

According to another aspect of the present technique, the encoded data packet is transmitted as a plurality of OFDM symbols each of which is formed by a plurality of modulation symbols carried by a corresponding plurality of sub-carrier signals of the wireless access interface and each OFDM symbol carries encoded data symbols of the encoded data packet, the plurality of OFDM symbols being transmitted repeatedly. The controller circuitry is configured in combination with the receiver circuitry to combine information of an encoded data packet received from one or more of the repeatedly transmitted OFDM symbols of the encoded data packet, to determine from the combination of the information received from the repeatedly transmitted OFDM symbols whether the data carried by the encoded data packet can be successfully decoded, and depending on whether the data carried by each encoded data packet can be successfully decoded or not in accordance with the ARQ protocol, to control the transmitter circuitry to transmit the feedback signal.

According to this aspect of the present technique therefore, an early termination of a transmission of the encoded data packet as a plurality of repeatedly transmitted OFDM symbols representing different redundant versions of the encoded data packet can be achieved, by combining information received from the OFDM symbols, and after each combination determining whether data carried by the encoded data packet as the plurality of OFDM symbols can be correctly decoded. In one example, the data carried by the encoded data packet is encoded with a systematic error correction code and the systematic bits or symbols are carried by one or more of the plurality of OFDM symbols before one or more of the plurality of OFDM symbols carrying and the parity bits or symbols. Accordingly, the receiver may generate a feedback signal from determining whether the information carried by the systematic data symbols or bits can be used to detect the data carried by the encoded data packet without using information provided by the parity symbols.

Various further aspects and embodiments of the disclosure are provided in the appended claims, including but not limited to, a transmitter, a receiver, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which:

FIG. 4 is a schematic block diagram of an example of a transmitter which may form part of a communications device (UE) or a base station (eNodeB or gNB) of the wireless communications network shown in FIG. 1;

FIG. 5 is a schematic block diagram of an example of a receiver which may form part of a communications device (UE) or a base station (eNodeB or gNB) of the wireless communications network shown in FIG. 1;

DESCRIPTION OF EXAMPLE EMBODIMENTS

Embodiments of the present technique find application with wireless communications systems which provide a wireless access interface which utilises feedback between a receiver and a transmitter relating a status of transmission of a data packet or data unit, which may be communicated according to an automatic repeat request (ARQ) type protocol. As an illustration, example embodiments will be explained with reference to a wireless communications network, which utilises a wireless access interface according to an LTE standard. However embodiments of the present technique are not limited to LTE and have been developed in part for application with a new radio access technology or new radio (NR), which is also known as 5G. In other embodiments, a transmitter or a receiver may form part of a communications device or an infrastructure equipment such as an eNodeB (eNB) configured in accordance with an LTE standard or a gNodeB (gNB) configured in accordance with a 5G standard.

Figure 1:
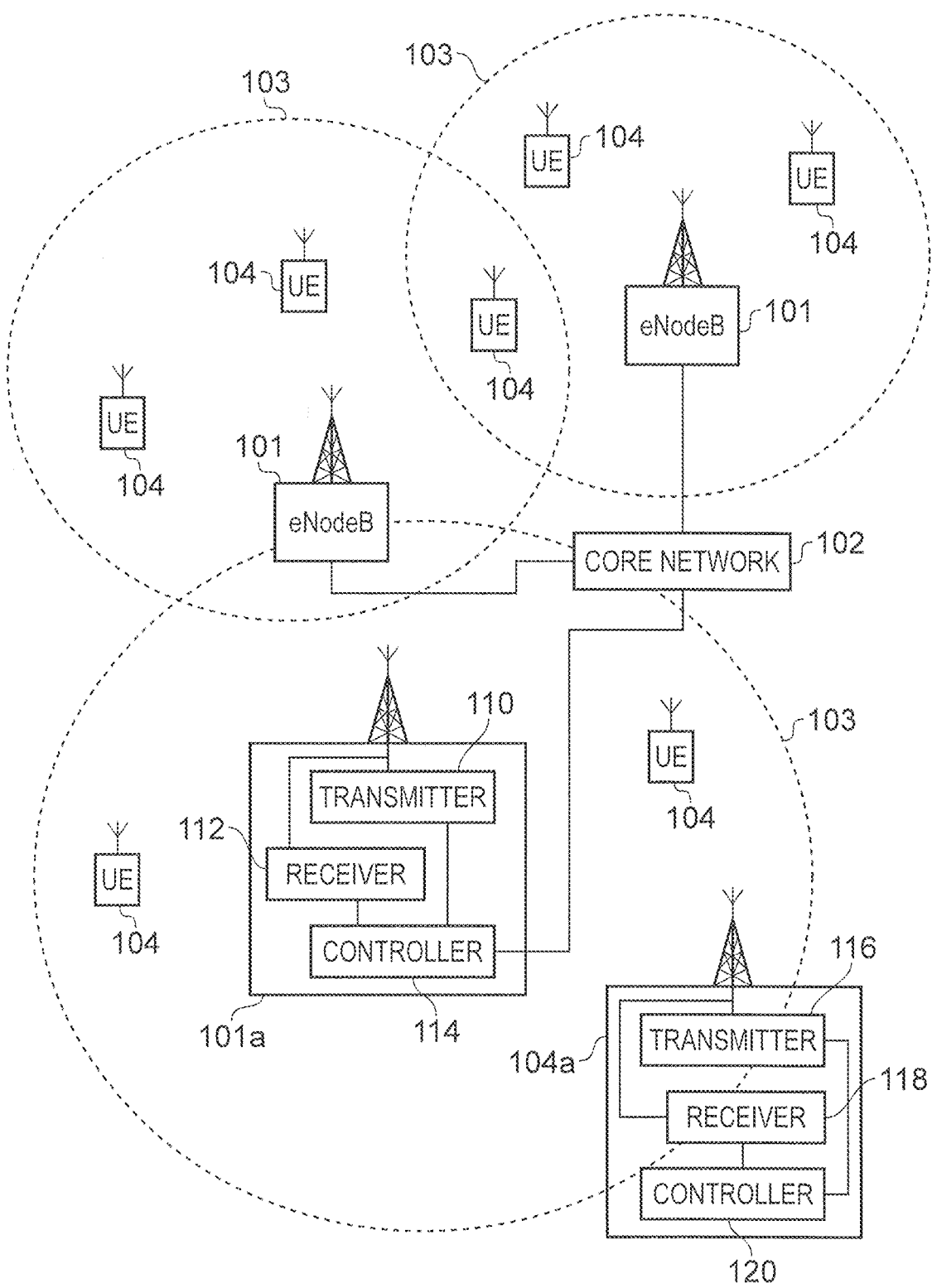
FIG. 1 provides a schematic diagram illustrating an example of a conventional mobile communications system.

As an example, FIG. 1 provides a schematic diagram illustrating some basic functionality of a mobile telecommunications network/system operating in accordance with LTE principles. Various elements of FIG. 1 and their respective modes of operation are defined in the relevant standards administered by the 3GPP (RTM) body, and also described in many books on the subject, for example, Holma H. and Toskala A [1] ISBN 9780470-319338 Fourth edition, 2007 Chapter 5. It will be appreciated that operational aspects of the telecommunications network which are not specifically described below may be implemented in accordance with any known techniques, for example according to the relevant standards.

FIG. 1 includes infrastructure equipment comprising base stations 101 which are connected to a core network 102, which operate in accordance with a conventional arrangement which will be understood by those acquainted with communications technology. The infrastructure equipment 101 may also be referred to as a base station, network element, or as explained above, an enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. The transmitter and the receiver may include radio frequency processing circuitry, base band signal processing circuits and as will be explained shortly error correction encoder and decoders and modulators and demodulators. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and a downlink by managing the communications resources of the wireless access interface. The controller 114 may therefore be implemented as a hardware processor configured in accordance with a predetermined specification or a software controlled processor.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. A controller circuit 120 controls the transmitter 116 and the receiver 118, and similar to the transmitter 110 and the receiver 112 in the eNodeB, the transmitter 116 and receiver 118 may be implemented as radio frequency circuits and signal processing hardware and circuitry, and the controller circuitry may be a hardware processor or software configured circuitry which controls the transmitter 116 and the receiver 118 in accordance with a predetermined specification.

As mentioned above, the embodiments of the present invention can also find application with advanced wireless communications systems such as those referred to as 5G or New Radio (NR) Access Technology. New Radio Access Technology (RAT) has been proposed in [3] to develop a new RAT for the next generation wireless communication system, i.e. 5G, and in 3GPP a Study Item (SI) on NR has been agreed [4] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

The elements of the wireless access network shown in FIG. 1 may be equally applied to a 5G new RAT configuration, except that in accordance with a change in terminology the base stations, which are an example of radio network infrastructure equipment, may also be referred to as transceiver stations/NodeBs/eNodeBs (eNBs)/gNodeBs (gNBs), and so forth. Similarly the communications devices may have a functionality corresponding to devices known for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
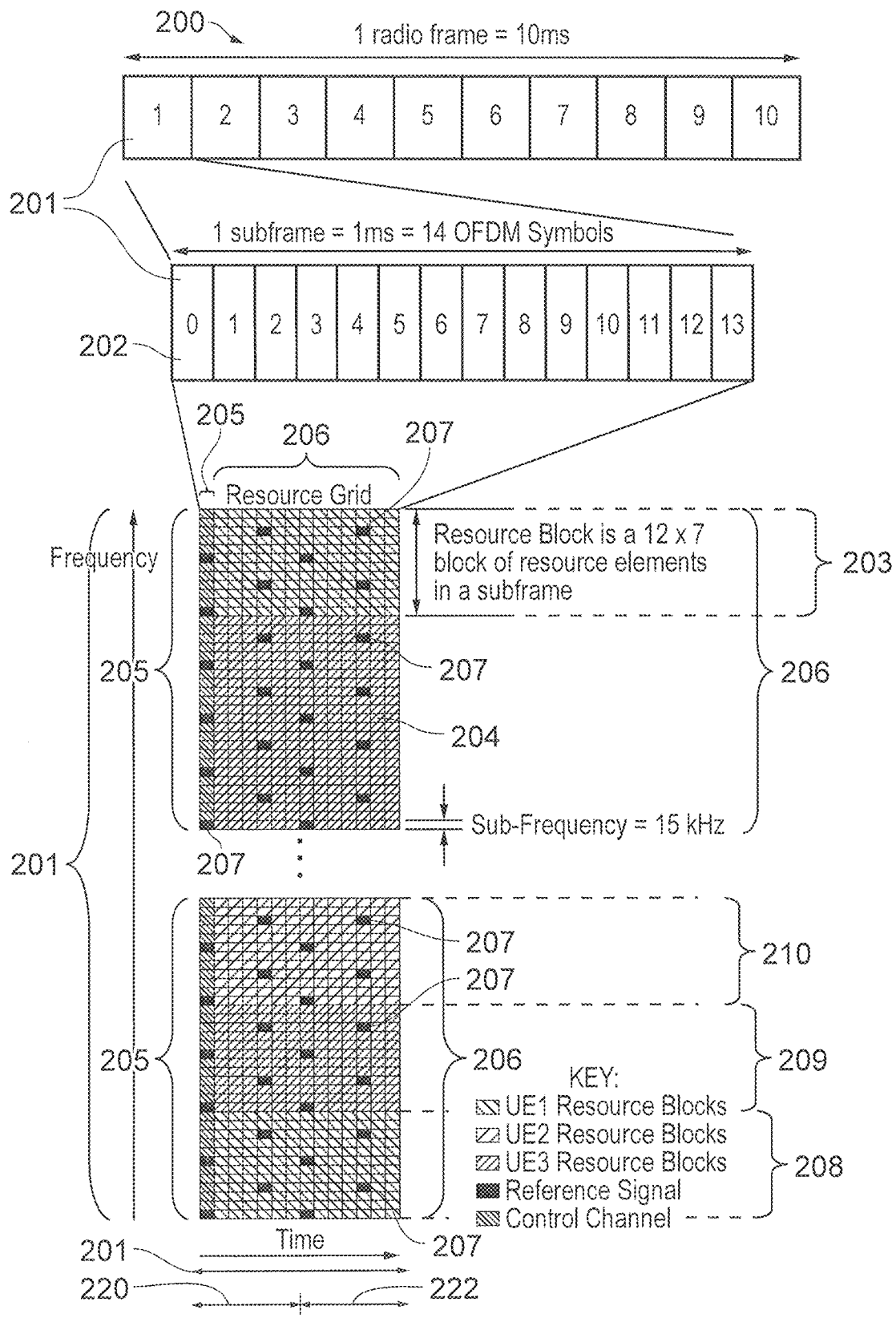
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each with a duration of 1 ms. Each sub-frame 201 is formed from 14 OFDM symbols and is divided into two slots 220, 222 each of which comprise six or seven OFDM symbols depending on whether a normal or extended cyclic prefix is being utilised within OFDM symbols for the reduction of inter symbol interference. The resources within a slot may be divided into resources blocks 203 each comprising 12 subcarriers for the duration of one slot and the resource blocks are further divided into resource elements 204 which span one subcarrier for one OFDM symbol, where each rectangle 204 represents a resource element. The resource elements distributed in time within a sub-frame and frequency across the host system bandwidth represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data and reference signals 207 which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, ePDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 2, UE1 has been allocated resources 208 of the data region 206, UE2 resources 209 and UE3 resources 210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 3:
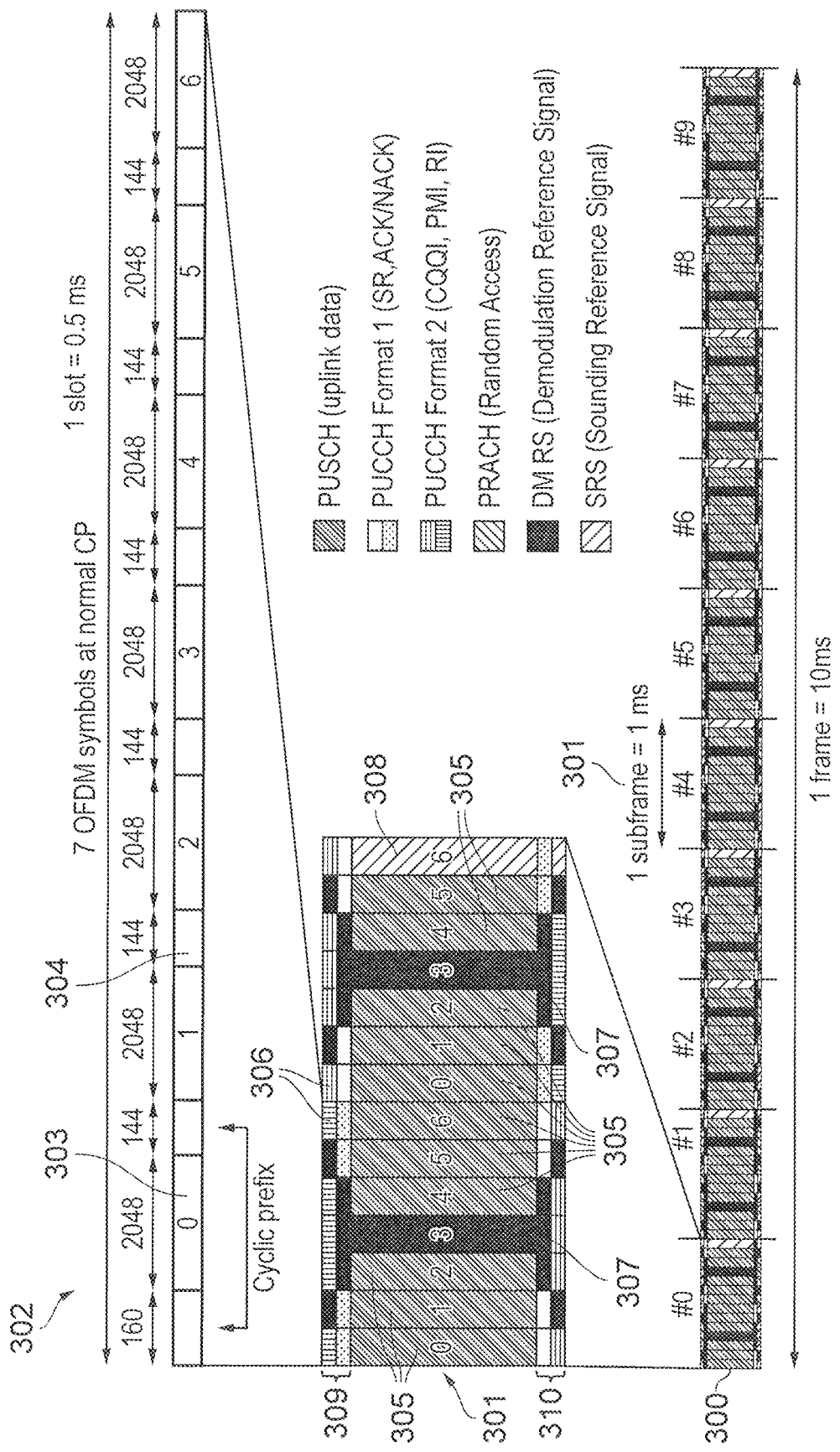
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Physical Layer Transmission and Reception

Embodiments of the present technique can find application in a transmitter and receiver which employs an OFDM-based waveform to transmit and receive data. Examples of OFDM-based waveforms include the LTE downlink and the LTE uplink, where the LTE uplink uses a Discrete Fourier Transform spread OFDM (DFT-S-OFDM) waveform. The LTE uplink hence implements an OFDM-based Single Carrier Frequency Division Multiple Access scheme (SC-FDMA). References to "OFDM" in the current description hence also apply to an SC-FDMA based waveform, as will be understood by a skilled artisan. As such, embodiments of the present technique can find application in a UE and an eNB of a wireless communications system, which may conform to an NR/5G standard or an LTE standard. An arrangement of signal processing blocks, which may be implemented as integrated circuits or processing units, which may be used to form part of physical layer processing in transmitters 110, 116 and receivers 112, 118 of a wireless communication system such as that of FIG. 1 are illustrated in FIGS. 4 and 5. FIGS. 4 and 5 will now be described in order to gain a better appreciation of the embodiments described in the following paragraphs.

As shown in FIG. 4 a data source 320 feeds data to be transmitted via the wireless access interface in for example the eNB or gNB to an automatic repeat request (ARQ) controller 322. The ARQ controller 322 forms the data from the data source 320 into data units for transmission in one or more subframes of the wireless access interface. The ARQ controller 322 may operate to control transmission of data in accordance with various types of ARQ processes known to those skilled in the art. Such techniques typically involve forming the data to be transmitted into data units, transport blocks or data packets for transmission. The ARQ controller 322 may operate in combination with a data encoder 324 to encode data packets to determine whether they have been correctly received and to improve the likelihood that the data packets are received correctly. In accordance with an ARQ protocol performed by the ARQ controller 322, a receiver may transmit a feedback signal representing either acknowledgement ACK, or a negative acknowledgment NACK in dependence upon whether a data packet has been successfully received or not received successfully. In response to detecting an NACK or not detecting an ACK, the ARQ controller 322 may respond by retransmitting the data unit which was not received correctly. In some examples, the ARQ controller may transmit increasing amounts of redundant data generated by the data encoder 324 in response to an indication that a data packet cannot be decoded. However there are many variations on ARQ protocols and the present technique is not limited to a particular protocol.

The data encoder 324 receives each data unit and performs encoding and scrambling to improve the integrity of the transmitted data and to provide some rejection of co-channel interference. The encoded data is then received at a modulator 326, which maps the data onto modulation symbols and performs other processing tasks to convert the modulation symbols into modulation cells. The modulation cells generated by the modulator 326 are then received by a resource element mapper 328 which maps the modulation cells onto the subcarriers of OFDM symbols 326 which in combination with the OFDM symbol builder 328 generates OFDM symbols. The OFDM symbols are then used to modulate a radio frequency carrier for transmission by an RF modulator 332 from the antenna 334.

As shown in FIG. 5 at the receiver a radio frequency detector may detect the transmitted signal (from the base station or UE as appropriate) using a radio frequency detector 340. The radio frequency detector 340 may in some configurations include a plurality of antennas 342, 344 which may provide a multiple input multiple output (MIMO) or single input, multiple output diversity scheme. An OFDM symbol detector 346 then receives a baseband version of the signal detected by the radio frequency detector and recovers the OFDM symbols. The OFDM symbol detector includes a forward Fast Fourier Transform (FFT) which transforms the time domain signal into the frequency domain. The OFDM symbols are then fed to a demodulator 348, which demodulates the subcarriers to generate for each sub-carrier a received modulation cell, which is then mapped back into the data symbols to reverse operations performed by the modulator. The received data is then fed to the data decoder 350 which performs error correction decoding, descrambling and error detection decoding (for example using a CRC check, which is used to generate the ACK/NACK) to reverse the operations performed at the transmitter by the data encoder 324 in order to improve the integrity of the received data and co-operates with an ARQ controller 352 in the receiver to determine whether data packets transmitted by the transmitter can be correctly received. The ARQ controller 352 therefore generates the ACK/NACK responses for transmission to the transmitter, using a receiver-transmitter 356 included in the entity with the receiver of FIG. 5 to organise the re-transmissions as appropriate. The ARQ controller 352 then reassembles the data units into the data as presented by for example a higher layer application which is forwarded to a data sink 354.

As shown in FIG. 5 the demodulator 348 includes an equaliser 346, a channel estimator 362 and an OFDM demodulation unit 364. The channel estimator 362 receives the detected OFDM symbol from the OFDM symbol detector 346 and generates an estimate of an impulse response of the channel through which the received OFDM symbol has passed. The impulse response may be generated in the frequency domain as a set of estimated phase and amplitude distortions across the frequency domain. To this end, according to a conventional arrangement, the received OFDM symbol includes reference symbols which transmit known symbols which when correlated with a reproduction of those symbols are used to generate an estimate of the impulse response of the channel. The channel estimate is therefore fed to the equaliser 360, which compensates for the distortions caused by the channel, from the received modulation symbols. The OFDM demodulation unit then demodulates the OFDM symbol to provide log-likelihood ratios (LLRs) on the bits associated with the modulations symbols. The LLRs are an example of soft decision bits. As will be appreciated there are other ways of performing equalisation of the received signal which can be done in the frequency domain or the time domain and therefore the equaliser 360 may form part of the OFDM demodulation unit 364. However the architecture showing in FIG. 5 has been provided in order to illustrate an example embodiment to the present technique which will be explained shortly.

The example transmitter and receiver shown in FIGS. 4 and 5 are configured to transmit data using an ARQ process according to a conventional arrangement of a transmitter and receiver chain. Embodiments of the present technique can provide an arrangement in which a throughput or bandwidth of data communicated by such an example transmitter and receiver chain incorporating an ARQ process can be improved, with an ARQ technique which relies on repeated transmission of data units or packets until that data unit or packet can be successfully decoded. As such embodiments of the present technique can find application with URLLC devices, such as those which find application with LTE or 5G new radio (NR). According to the present technique, a UE can send an early termination signalling to the eNB or gNB.

As indicated above, in some examples an ARQ technique uses repetitions, in which a data unit or packet is transmitted repeatedly until the data unit can be decoded. Repeatedly received data units are combined at the receiver so that there is a greater likelihood that the data unit will be successfully decoded, the more transmissions of the data packet are received. According to an example ARQ protocol, the data packets are repeatedly re-transmitted until an ACK is sent, or a NACK is sent until the data unit can be decoded. Accordingly, for example, when the eNodeB transmits a data packet using repetitions to the UE, the UE can decode the data packet before the full set of repetitions has been received. If so, then the UE can send an early ACK signal (early termination signalling) to indicate that it has received the transmission. In this case, the eNB/gNB can stop transmission of further repetitions of the packet.

According to a conventional arrangement early termination represents an HARQ-ACK that requires the UE to completely decode the entire data unit or packet. In contrast, embodiments of the present technique can provide an arrangement in which feedback is given at different stages or levels of the decoding process, in which the entire data unit or packet does not need to be completely decoded when sending one of these intermediate acknowledgements.

Embodiments of the present technique can therefore provide an improvement to communications services, which deliver data with a relatively high reliability and with a relatively low latency. Such communications services therefore present a significant challenge when communicating via wireless access interfaces in which the radio communications conditions vary and the communications device transmitting or receiving the data may be mobile. In one example the communications may provide an ultra reliable low latency communications (URLLC) service, such as that being proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of OFDM symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

Figure 6:
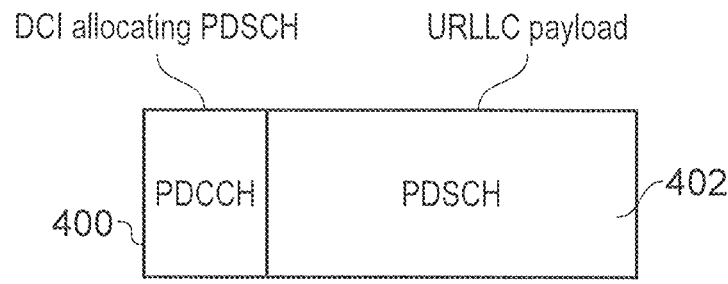
FIG. 6 is a schematic representation of a packet transmission according to an Ultra Reliable Low Latency Communications (URLLC) service using a PDCCH channel and a PDSCH channel forming part of the downlink of the wireless access interface according to an LTE standard.
Figure 7:
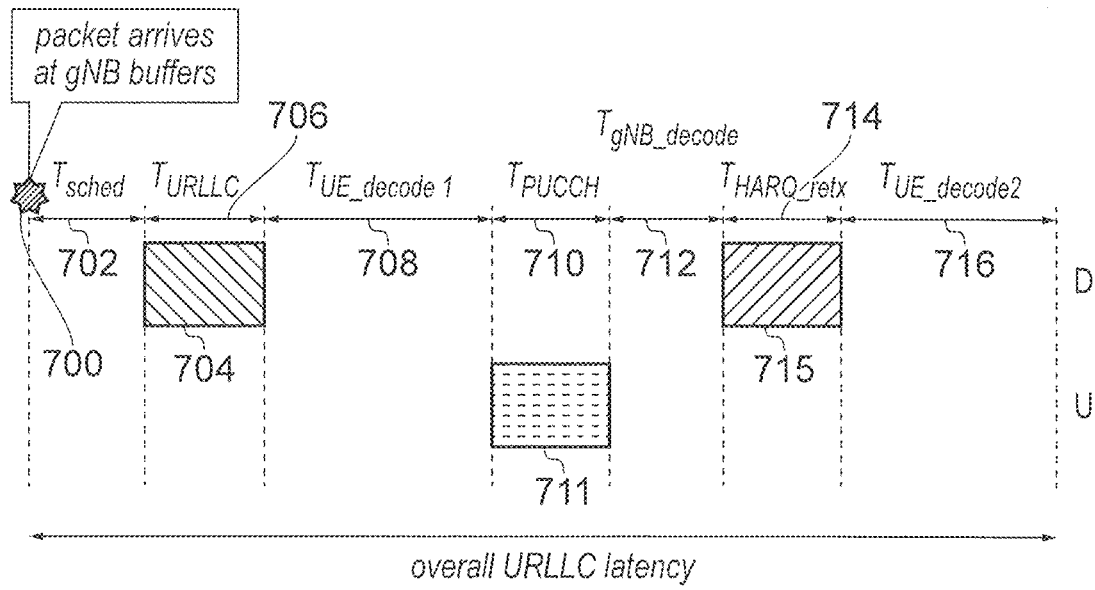
FIG. 7 is a part schematic block diagram, part flow diagram illustrating a time duration of various processes required to transmit a URLLC packet shown in FIG. 6.

As shown in FIG. 6, a URLLC transmission may be scheduled using a downlink control indicator (DCI) in a physical downlink control channel (PDCCH), which is transmitted before the physical downlink shared channel (PDSCH) that carries the URLLC payload, as shown in FIG. 6. The URLLC transmission is shown in FIG. 6 to be comprised principally of two parts, a section comprising the PDCCH 400 carrying the DCI and a section comprising the PDSCH 402 carrying the URLLC payload. FIG. 7 shows how the overall URLLC latency is composed of various factors, which are introduced by each step of a process in the transmission of a data unit using an ARQ process. As shown in FIG. 7 a transmission from a base station to a communications device for example, such as for example an eNB or gNB to the UE, comprises different stages, each of which requires a certain processing time. The time durations shown in FIG. 7 are not necessarily to scale. The total latency of the HARQ operation is dependent on the following factors:

Initially, a packet arrives at the gNB buffers 700.

$T_{sched}$. The gNB schedules the packet to be transmitted at the next possible opportunity, e.g. at the next mini-slot boundary, which is represented as $T_{sched}$ 702.

$T_{URLLC}$. The URLLC packet 704 is transmitted over the air, which is represented as $T_{URLLC}$ 706. The duration of transmission is a mini-slot and for these purposes, assumed to include the propagation time it takes to arrive at the antenna of the receiver.

$T_{UE\_decode1}$. The URLLC packet is decoded in a time $T_{UE\_decode1}$ 708, which includes the processes of channel estimation, FEC decoding and CRC decoding.

$T_{PUCCH}$. An ACK/NACK is transmitted 711 in accordance with the ARQ process on the PUCCH physical channel, as represented by a time $T_{PUCCH}$ 710. The PUCCH may be timing advanced, which can be considered to be taken into account in the time $T_{PUCCH}$. The propagation time can also be considered to be taken into account in the time $T_{PUCCH}$. In the example of FIG. 7, a NACK is transmitted by the UE.

$T_{gNB\_decode}$. The gNB decodes the PUCCH, which is represented in FIG. 7 as time $T_{gNB\_decode}$ 712 and schedules a HARQ re-transmission 715 of the URLLC packet, as represented by a time $T_{HARQ\_retx}$ 714.

$T_{UE\_decode2}$. According to the ARQ protocol, the HARQ re-transmission is combined with the initial transmission and is decoded by the UE, as represented by a decoding time $T_{UE\_decode2}$ 716.

The time between transmission of packet 704 and the re-transmission of that packet 715 in a HARQ protocol is termed the HARQ round trip time (RTT). The HARQ RTT is dependent on the latencies discussed above.

Having regard to the above time periods, relative to the overall URLLC latency, the time duration $T_{UE\_decode1}$ can be substantial. As such, a technical problem can be to reduce the HARQ round trip time in order to reduce the overall URLLC latency.

Figure 8:
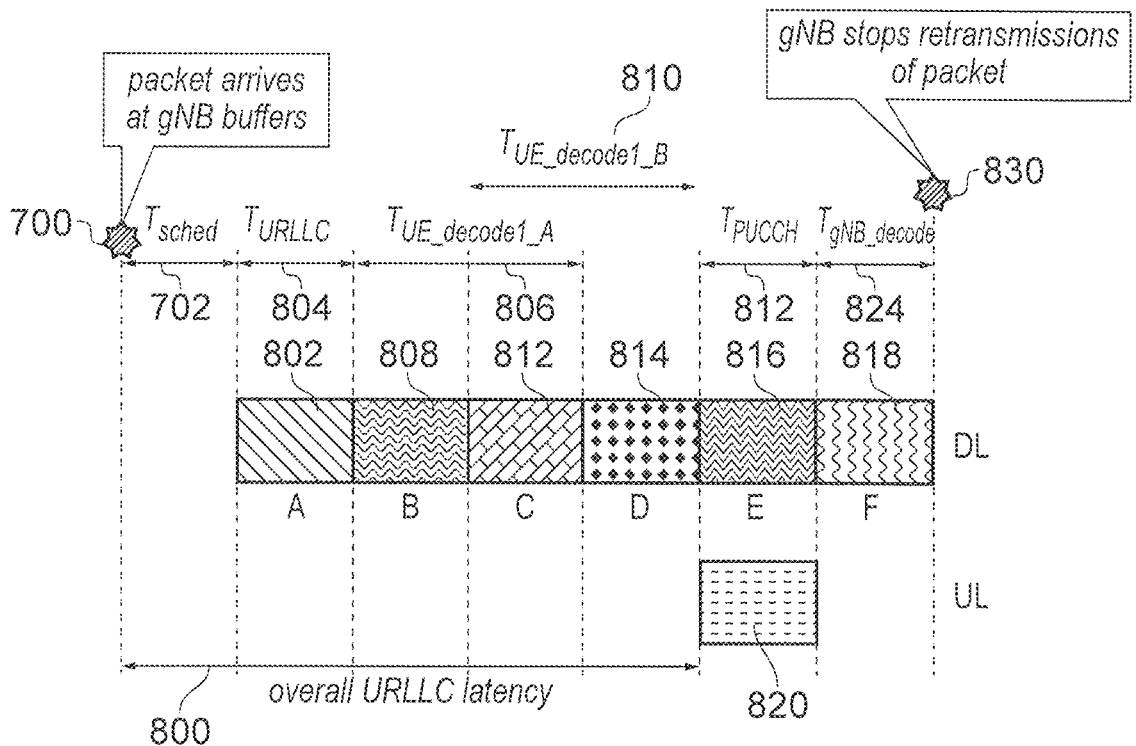
FIG. 8 is a part schematic block diagram, part flow diagram illustrating a process of transmitting a URLLC packet of FIG. 6 using repeated transmission and associated time duration of various processes.

In another arrangement, FIG. 8 shows the overall URLLC latency 800 and resource usage for a URLLC transmission when repetition is applied. As explained above, repetition can be used as part of an ARQ protocol to transmit the same data packet repeatedly until the data packet can be successfully decoded, such as using a CRC check as explained for the example shown in FIGS. 4 and 5.

The operation of URLLC for this example comprises a combination of processes causing latency and resource usage as represented in FIG. 8, which is composed of the following aspects:

Initially, a packet arrives at the gNB buffers 700.

$T_{sched}$. The gNB schedules the packet to be transmitted at the next possible opportunity, e.g. at the next mini-slot boundary 702.

$T_{URLLC}$. The URLLC packet 802 is transmitted over the air. The duration of transmission $T_{URLLC}$ is a mini-slot 804. The packet A 802 is transmitted by the gNB.

$T_{UE\_decode1\_A}$. The UE decodes packet A and the CRC fails (incorrect decoding of A), which is represented by the time duration $T_{UE\_decode1\_A}$ 806.

A second repetition of the URLLC packet is transmitted as packet B 808 by the gNB.

$T_{UE\_decode1\_B}$. The UE decodes packet A in combination with packet B, which takes a duration of $T_{UE\_decode1\_B}$ 810, and for this example, the CRC eventually passes.

C, D, E, F. Until the gNB determines that the URLLC packet has been correctly decoded by the UE, it transmits repetitions of the URLLC packet, represented in FIG. 8 as repetitions C 812, D 814, E 816, F 818.

At the end of the time $T_{UE\_decode1\_B}$ 810, the UE correctly decodes packet A in combination with packet B and sends an ACK 820 on a PUCCH. The transmission of the PUCCH takes a time of $T_{PUCCH}$ 822.

$T_{gNB\_decode}$. The gNB decodes the PUCCH in a time duration $T_{gNB\_decode}$ 824, determines that the UE has received the URLLC packet and stops sending repetitions of the URLLC packet 830.

The overall latency of the repetition scheme shown in FIG. 8 is less than the latency shown for the HARQ re-transmission scheme of FIG. 7, but the resource usage is less efficient, because the gNB transmits the URLLC packet six times, whereas only two transmissions were required for the HARQ re-transmission example of FIG. 7.

Embodiments of the present technique can provide an arrangement which can reduce resource wastage when URLLC is transmitted with multiple repetitions of the URLLC packet associated with an automatic repeat request-type protocol.

First Example Embodiments: Early Indication/Running Feedback on Reception Status Embodiments of the present technique can provide an arrangement, which reduces a time of transmission of a URLLC packet. The reduction of time and resources used can be achieved by triggering an early HARQ re-transmission of that packet. This is achieved by running feedback on the reception status of the URLLC packet giving an early indication of the reception status of an URLLC packet, which can therefore be used to at least prepare for a re-transmission of the URLLC packet, even if this is subsequently not needed. For example, this early indication can be provided by the UE to the gNB. According to the present technique therefore, the receiver shown in FIG. 5 is adapted as shown in FIG. 9 to provide an early indication as to whether or not the URLLC packet is likely to be successfully decoded.

Figure 9:
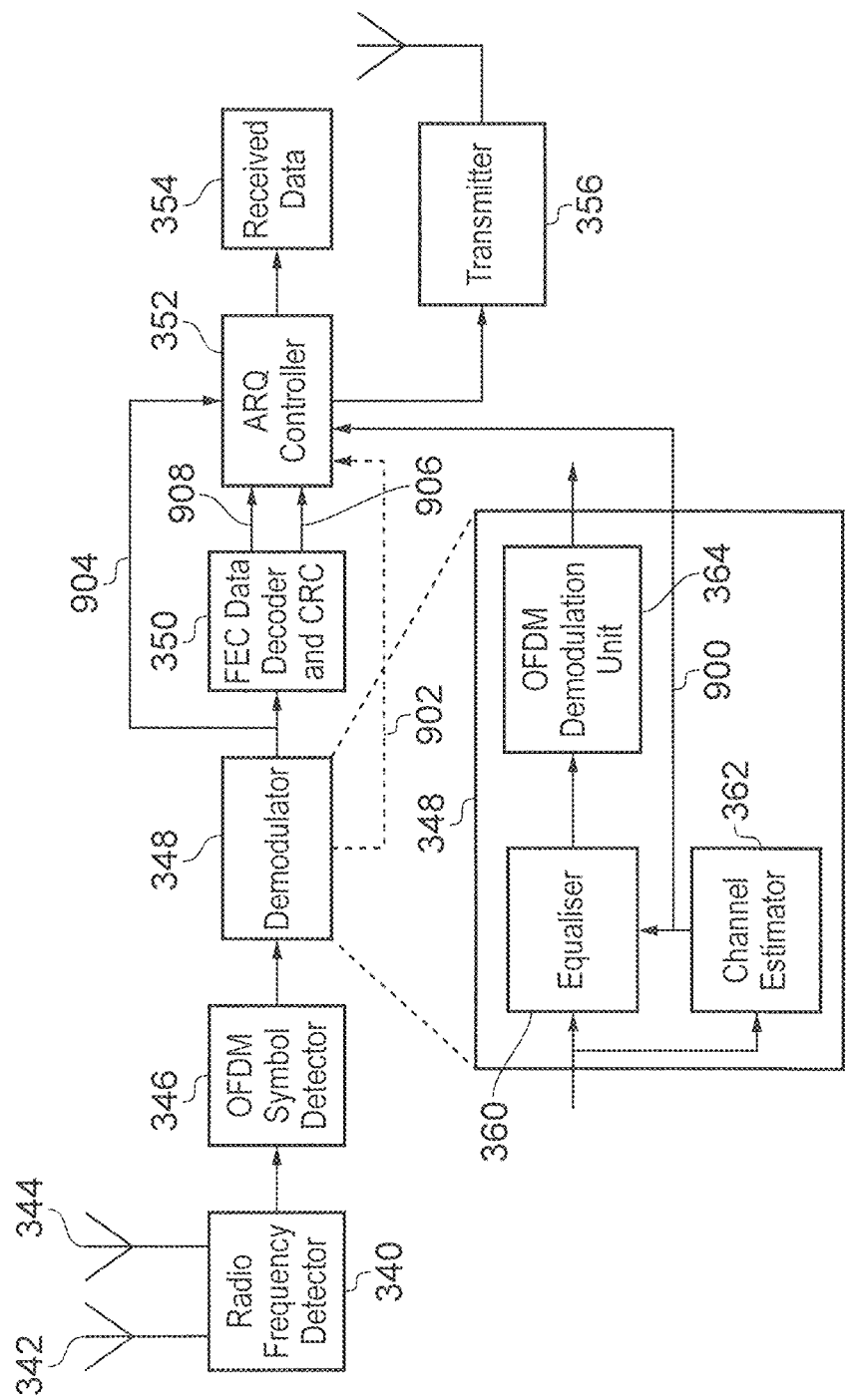
FIG. 9 is a schematic block diagram of a receiver which has been adapted to embody an example of the present technique to provide an early indication of reception of a packet.

FIG. 9 provides a schematic block diagram of an adapted receiver corresponding to the example showing in FIG. 5. Accordingly, corresponding parts have the same numerical designations, and only the differences in FIG. 9 with respect to the receiver shown in FIG. 5 will be explained.

As shown in FIG. 9, various additional channels are provided in relation to various points of the receiver chain which are fed to the ARQ controller 352. As will be explained, these additional channels serve to provide the ARQ controller 352 with signals representing characteristics of processes which are required to recover an estimate of the data from a received encoded data packet, which can be used to generate a quality measure representing a likelihood of correctly recovering the data from the received encoded data packet. Such a quality measure can be used to generate an early feedback signal, such as an ACK/NAK, before the encoded data packet has been completely decoded.

In a first example a receiver chain is used to decode the PDCCH transmission and generates an ACK for the PDCCH (PDCCH ACK) within the ARQ controller 352 which in combination with the transmitter 356 generates the PDCCH ACK for transmission to the transmitter. If however the PDCCH ACK is not received then the transmitter side for example the eNB recognises that the URLLC packet will not be decoded and therefore reschedules the transmission of the URLLC packet.

As a second example a receiver uses the reference symbols which are used for channel estimation in order to derive for example a quality measure of the received signal for example the signal to noise ratio. Accordingly, the ARQ controller 352 receives the indication from the channel estimator 360 of the estimate of channel and/or the reference symbols or the signal to noise ratio determined from the reference symbols and from these generates an estimate of whether or not the receiver will be able to detect the URLLC packet. As a result the ARQ controller 352 can generate an early NACK based on the channel estimate. Accordingly a channel 900 feeds an indication of the quality of the reception based on the channel estimate, from the channel estimator to the ARQ controller 352 and a channel 902 receives the an indication of the quality of the reception based on the detected reference symbols from the demodulator 348 to the ARQ controller 352.

As a third example the demodulator 348 may generate log likelihood ratios representing soft decisions of the data bits of the received encoded data packets. These may be for example generated by the OFDM demodulation unit 364. A quality estimate based on the quality of the log likelihood ratios is fed to the ARQ controller 352 via a channel 904. The quality of the log likelihood ratios can therefore be used as a physical estimate of the likelihood of the URLLC packet being decoded and accordingly the ARQ controller can generate an early NACK of the likelihood of physically decoding the URLLC packet referred to as a physical NACK. Further explanation will be provided with reference to FIG. 10.

As a further example, the FEC data decoder 350 can be adapted to provide an early indication that the error correction decoder, which decodes the data of the URLLC packet which has been encoded with a forward error correction code, is likely to be able to recover the URLLC packet correctly. If it is estimated that the URLLC packet cannot be correctly decoded then an early NACK indication is provided on an additional channel 906 separately from the data channel representing the decoded URLLC packet 908 which is fed to the ARQ controller 352. Accordingly, for example, depending on the FEC coding which is being used to encode the data carried by the URLLC packet, an early indication can be given as to the likelihood of correctly recovering the data from the packet. For example if a convolutional code has been used then an indication of the relative difference between the metrics of the paths through a trellis representing all possible changes of state of the encoder can be used to give an indication of the likelihood of correctly recovering the data. As explained below in another example a turbo decoder can be used to decode a turbo encoded packet.

Figure 10:
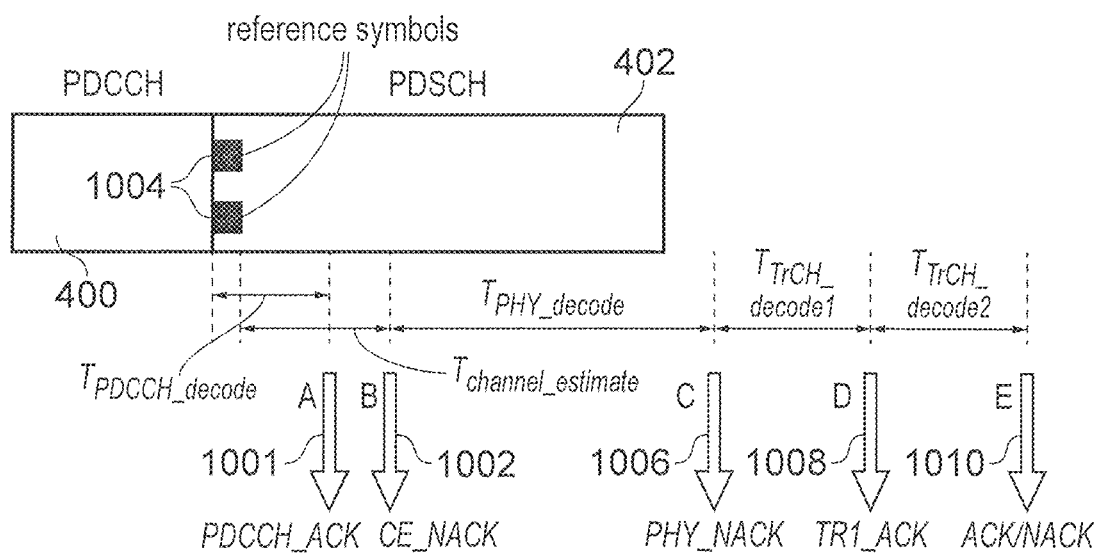
FIG. 10 is a part schematic block diagram, part flow diagram illustrating transmission of a URLLC packet of FIGS. 6 and 10 with a sequence of events associated with the transmission with corresponding time durations of processes involved in transmitting the packet.

In order to better illustrate example embodiments of the present technique of which the operation of the receiver of FIG. 9 is but one example, an effect of the operation of an adapted transmitter and an adapted receiver is illustrated in FIG. 10, which is explained as follows:

Event A 1001: After PDCCH transmission, the PDCCH is decoded as explained with reference to FIG. 9. If the UE receives the PDCCH, it transmits a "PDCCH ACK" signal to the gNB as represented by event A 1001. If the gNB does not receive the PDCCH ACK, it knows that the UE did not receive the PDCCH and will hence re-schedule the URLLC packet in advance of the time this at which it would expect an ACK/NACK indication based on CRC decoding of the URLLC packet (i.e. in advance of 1010).

Event B 1002: The UE uses reference symbols 1004 at the start of the PDSCH transmission to derive a channel estimate as explained above for the example receiver of FIG. 5. As explained above, as part of the channel estimate derivation, the UE may determine an SNR estimate. The UE determines whether the channel estimate and/or SNR estimate are of sufficient quality to decode the MCS (modulation and coding scheme) that was signalled for PDSCH in the PDCCH. If these values are deemed to be insufficient, the UE transmits a "CE NACK" as part of event 1002 to the gNB. If the gNB receives a CE NACK as part of this event 1002, it will re-schedule the URLLC packet before the remaining receiver operations are applied to decode the URLLC packet. It should be noted that a CE NACK is not the same as a NACK of the HARQ packet. The CE NACK is just an indication that the channel estimate is estimated to be of insufficient quality to decode the HARQ packet. However, the UE may still eventually be able to decode the HARQ packet.

Event C 1006: The UE performs some physical decoding of the URLLC packet. Physical decoding includes generation of LLRs based on demodulation of detected resource elements. For this reason, for example the Demodulator 348 in the receiver of FIG. 9, may be adapted to forward a quality estimate based on the quality of the log likelihood ratios directed to the ARQ Controller 352 via the connecting channel 904. The physical channel processing functionality in the UE can determine whether there seems to be an issue with the received packet, such that it is likely that a HARQ re-transmission will be required. If it is determined that a HARQ re-transmission is probably required, based on a relative measure of the quality of the LLRs, the UE transmits a PHY NACK signal as part of this event 1006 to the gNB.

The quality of the physical channel processing can be estimated in various ways:

A histogram of derived LLR values can show the percentage of LLR values that are close to zero. If the cumulative number of LLR values close to zero exceeds a threshold that is determined based on the MCS, it is likely that the reliability of the received packet is low.

Known reference symbols can be inserted in the PDSCH region. The received signals can be compared to these known reference symbols in order to determine the reliability of the received packet.

Parity bits or CRC bits formed on the received physical bits can indicate the reliability of the packet. If many of these CRC/parity checks fail, then it is likely that the URLLC packet will be undecodable.

Event D 1008: During initial stages of transport channel processing, an estimate of the decodability of the URLLC packet can be made using metrics generated as part of the forward error correction (FEC) decoding. For example, when the URLLC packet uses Turbo coding FEC, if the Turbo decoding leads to a correct CRC result after a few iterations, the UE can transmit an early indication that the URLLC packet has been decoded by sending a "TR1_ACK" signal as part of this event 1008 to the gNB. When the URLLC packet uses low density parity check (LDPC) FEC, if the extrinsic information checks between decoding iterations start showing a flat response at low average value, this could be an indication that the probability of correct decoding will be low. The UE can send a "TR1 NACK" signal as part of this event 1008 to the gNB in this instant.

Event E 1010: After completion of decoding of the URLLC packet an ACK/NACK is transmitted by the ARQ controller 352 in accordance with a conventional operation.

In terms of transmission of the ACK/NACK signals in FIG. 10, there are various modes of operation:

If the UE receives the PDCCH, it transmits all of A 1002, B 1002, C 1006, D 1008, E 1010.

If the UE receives the PDCCH, if one of B 1002, C 1006 or D 1008 are NACK, the UE:
transmits the appropriate NACK at B 1002, C 1006 or D 1008
abandons decoding of the URLLC packet
does not transmit further NACKs (e.g. if the CE NACK at B 1002 indicates NACK, the UE will not transmit further NACKs for C 1006, D 1008 and E 1010).

If the UE receives the PDCCH, if one of B 1002, C 1006 or D 1008 are NACK, the UE:
transmits the appropriate NACK at B 1002, C 1006 or D 1008
continues decoding of the URLLC packet
does not transmit further ACKs or NACKs among the set B 1002, C 1006 or D 1008, because the gNB will have already decided to send a HARQ re-transmission
transmits an overall ACK/NACK indication of the URLLC packet at E 1010

The gNB can schedule a HARQ re-transmission based on any of the ACK/NACKs A 1001, B 1002, C 1006, D 1008, E 1010, for example:
If there is no PDCCH ACK at A 1001, the gNB schedules a HARQ re-transmission
If there is a NACK at any of B 1002, C 1006, D 1008 or E 1010, the gNB schedules a HARQ re-transmission As will be appreciated from the above explanation, the intermediate feedback events A 1001, B 1002, C 1006, D 1008 and E 1010 are generated from different quality measures which are evaluated in order to provide a "running commentary" of the reception status of an encoded data packet. According to example embodiments of the present technique therefore a communications device may be configured to transmit the early indications of the feedback signal to the wireless communications network in response to an evaluation of one or more quality measures of the encoded data packet, such as the example quality measures which are used to generate feedback signals A 1001, B 1002, C 1006, D 1008 and E 1010. The one or more quality measures may be generated from the same or different processes of the receiver circuitry.

The intermediate feedbacks A 1001, B 1002, C 1006, D 1008 and E 1010 may not all need to be implemented. Some of these intermediate feedbacks can be combined, for example the feedback A 1001 can be combined with B 1002, i.e. send only feedback B 1002 where if the gNB receives an ACK from feedback B 1002 it means the PDCCH is also received correctly in addition to having good channel estimates.

Second Example Embodiments: URLLC Transmission Format for Repetition

Embodiments of the present technique can also provide an arrangement in which a transmission format for a data packet such as a URLLC packet is created such that additional OFDM symbols act as redundant versions for the previous OFDM symbols that have been transmitted. The UE can then decode the URLLC packet on an OFDM symbol by OFDM symbol basis. Accordingly, for example, an FEC decoding attempt can be made at the end of every OFDM symbol, depending on UE capability. For example, a less capable UE could make an FEC decoding attempt at the end of every 'n' OFDM symbols, rather than after every OFDM symbol.

In one example, once the UE has correctly decoded the packet, it sends an ACK to the gNB. According to this example, there is no need for a NACK transmission, since symbols of the URLLC packet will be repeated until ACK is received.

Figure 11:
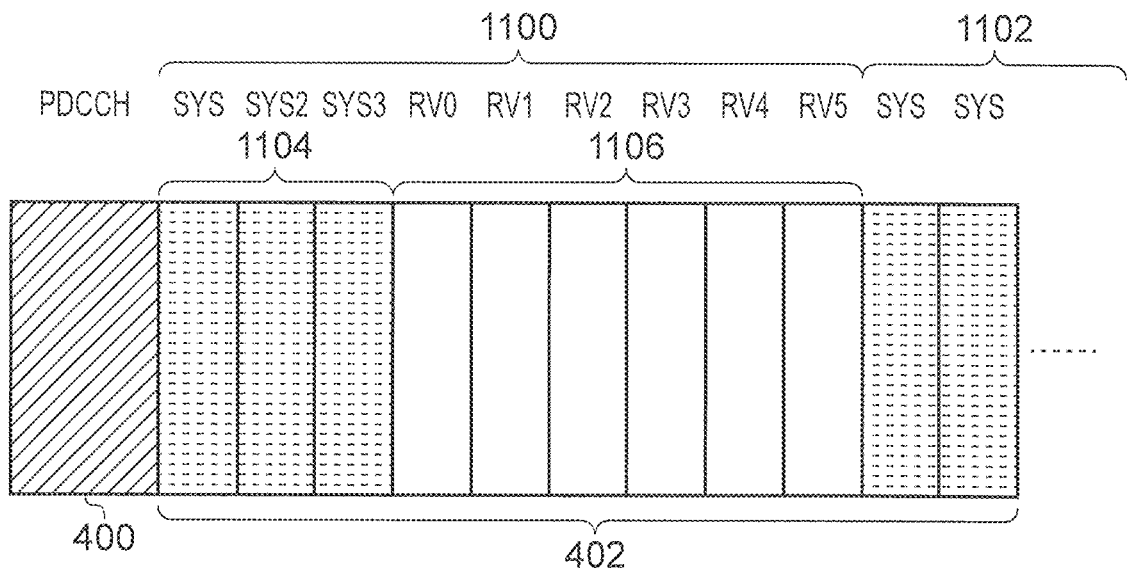
FIG. 11 is a schematic representation of an example embodiment of the present technique in which a packet or data unit is transmitted by repeatedly transmitting OFDM symbols carrying the packet or data unit.

FIG. 11 illustrates the transmission format of the URLLC packet according to an example embodiment of the present technique, corresponding to the example of the URLLC packet according to FIGS. 6 and 10. As shown in the example provided in FIG. 11, the transmission of the URLLC packet which comprises the PDSCH transmission includes repeated transmission of data 1110, 1102 carrying OFDM symbols. Hence 1100 is an encoded data packet and 1102 is a repetition of that encoded data packet. The modulation cells of the OFDM symbols carry payload data encoded with a forward error correction code (FEC). For the example shown in FIG. 11, the FEC generates codewords in systematic form, comprising modulation symbols SYS1, SYS2, SYS3 1104, followed by redundant data generated by the FEC encoder RV0, RV1, RV2, RV3, RV4, RV5 1106. This redundant data may be transmitted in the form of redundancy versions. FIG. 10 shows OFDM symbols carrying either systematic bits or parity bits, but in other embodiments, OFDM symbols could carry a mixture of systematic bits and parity bits (e.g. OFDM symbols that are transmitted earlier preferentially carry systematic bits and OFDM symbols that are transmitted later preferentially carry parity bits). In embodiments of the present technique, it should be appreciated that the terms "systematic symbol" and "systematic bit" are interchangeable, and that the terms "parity symbol" and "parity bit" are interchangeable. The modulation symbols carrying the same data in modulation cells of the OFDM symbols are repeated in the next transmission of the URLLC packet 1102. In one example the data may be encoded by the FEC encoder in accordance with a Turbo-coded format although in other examples, the transmission can be FEC coded with other coding schemes, such as LDPC. FIG. 11 illustrates the following:

The URLLC transmission is allocated using a PDCCH 400. This is shown as occupying more than one OFDM symbol, but it could also occupy a single OFDM symbol or merely a set of resource elements within an OFDM symbol.

The PDCCH carries a DCI and the DCI provides information on the format of the following OFDM symbols. For example, the DCI indicates the transport block size and modulation scheme applied to the URLLC packet. The DCI may also indicate how the redundancy versions 1106 R0, RV1, ... RV5, ... are formed.

Three OFDM symbols are shown transmitting resource elements relating to systematic bits 1104. It is known that for a Turbo code, the systematic bits 1104 have a higher priority than the parity bits 1106. Equivalently for LDPC codes, not all bits of each codeword are equally protected. The more robustly protected bits can also be transmitted first.

Further OFDM symbols are shown transmitting different redundancy versions of the parity bits 1106 of the Turbo code. For a rate 1/3 turbo code, there are two parity bits per systematic bit. Hence there are six OFDM symbols of redundancy versions RV0, RV1, RV2, RV3, RV4, RV5, 1106 relating to three OFDM symbols of systematic bits SYS1, SYS2, SYS3 1104. The redundancy versions 1106 are created so as to provide sets of parity bits that are evenly spread out through the Turbo codeword and preferably each redundancy version contains an orthogonal set of parity bits to other redundancy versions.

A repetition of an encoded data packet 1102 is shown consisting of OFDM symbols, starting with a transmission of a next cycle of systematic bits.

FIG. 11 shows repeated encoded data packets 1100, 1102 being transmitted. It will be understood that the repetition factor can be unity, such that a single encoded packet 1100 is transmitted, where the encoded data packet is formed of OFDM symbols carrying different redundancy versions.

In decoding the transmission format shown in FIG. 11, according to one example, the receiver performs the following steps:

Decodes PDCCH 400 and determines the parameters of the URLLC packet.

Receives and performs initial processing on the OFDM symbols containing the systematic bits 1104 (symbols SYS1, SYS2, SYS3).

The receiver attempts to decode the URLLC packet just on the basis of the systematic bits 1104. This can be performed for example by the FEC data decoder and CRC unit 350 of the receiver shown in FIG. 9. If it succeeds, the ARQ Controller 352 transmits an ACK to the gNB after SYS3.

The receiver next processes the OFDM symbol containing RV0. It attempts to decode the URLLC packet on the basis of SYS1, SYS2, SYS3, RV0. i.e. the receiver combines the received information (e.g. LLRs) from encoded data symbol of an encoded data packet from one or more of the transmitted OFDM symbols. If it succeeds, the ARQ Controller 352 transmits an ACK to the gNB after RV0.

The UE receives the OFDM symbol containing RV1. The FEC data decoder 350 attempts to decode the URLLC packet on the basis of SYS1, SYS2, SYS3, RV0, RV1. If it succeeds, the ARC Controller 352 transmits an ACK to the gNB after RV1.

According to the present technique the above process continues and is ongoing. The gNB for example keeps transmitting extra OFDM symbols and the UE attempts to decode the URLLC packet after every OFDM symbol. In an embodiment, the OFDM symbols may be transmitted up to a predetermined maximum scheduled number of times, or the encoded data packet may be transmitted up to a predetermined maximum scheduled number of times. The predetermined maximum scheduled number of times may be signalled to the UE via DCI signalling (e.g. carried by a PDCCH 400), or signalled by other unicast or broadcast means to the UE. If the UE correctly receives the URLLC packet, it sends an ACK to the gNB and the gNB terminates transmission as soon as it has decoded the ACK.

Figure 12:
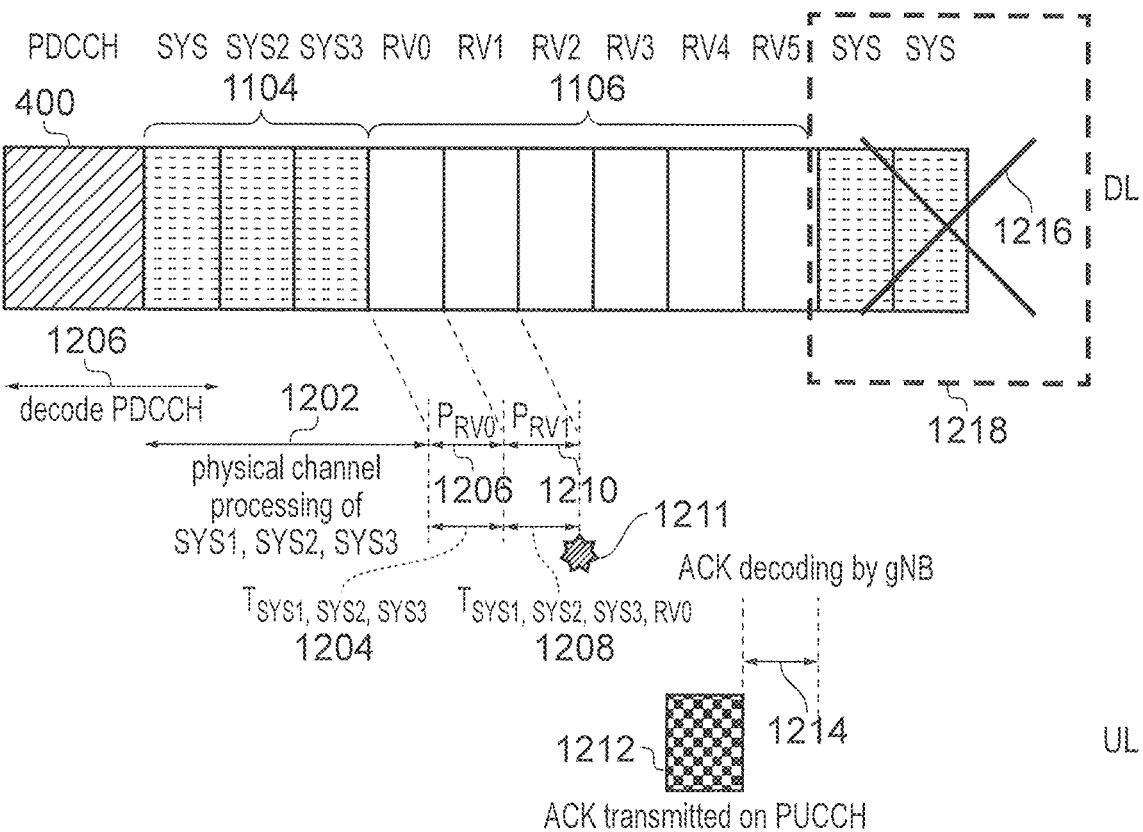
FIG. 12 is a part schematic block diagram, part flow diagram illustrating a process performed by a receiver embodying the present technique in order to provide an early detection of the packet or data unit.

According to the example embodiment illustrated in FIG. 11 the URLLC transmission is continuous and ongoing until the UE receives sufficient OFDM symbols to correctly decode the URLLC packet. FIG. 12 provides an example timing diagram showing decoding and HARQ feedback for the transmission format shown in FIG. 11. The example shown in FIG. 12 has the following features:

PDCCH 400 is transmitted over the air and is decoded by the UE, during a processing time 'decode PDCCH' 1200.

Physical channel processing is performed on symbols containing the systematic bits of the URLLC transmission SYS1, SYS2, SYS3 1104 during a processing time 'physical channel processing of SYS1, SYS2, SYS3' 1202.

Once physical channel processing of SYS1, SYS2, SYS3 1104 is complete, transport channel processing of these OFDM symbols 1104 commences within processing times $T_{sys1, sys2, sys3}$ 1204.

In parallel, physical channel processing of the symbol RV0 is performed as represented by a processing time $P_{RV0}$ 1206.

For an example in which the processing time $T_{sys1, sys2, sys3}$ 1204 led to a CRC failure, in that the URLLC packet could not be correctly decoded, the UE transport channel processing is started on a combination of the LLRs from the OFDM symbols SYS1, SYS2, SYS3, RV0 as represented by a processing time $T_{sys1, sys2, sys3, RV0}$ 1208.

In parallel, physical channel processing of the symbol RV1 is performed as represented by a processing time $P_{RV1}$ 1210.

For an example in which the transport channel processing of SYS1, SYS2, SYS3, RV0 is successful 1211, the UE's receiver can stop physical channel processing and transport channel processing of the OFDM symbols and transmits an ACK on PUCCH 1212.

Until the gNB can decode the ACK transmitted on the PUCCH, the gNB carries on transmitting OFDM symbols with further redundancy versions: RV2, RV3, RV4, RV5 1106.

After a processing time 'ACK decoding by gNB' 1214, the gNB decodes the ACK on the PUCCH. The gNB then aborts transmission of further redundancy versions 1106 as represented by a cross 1216 within a box 1218. That is to say that the scheduled subsequent transmissions of SYS1, SYS2 are aborted by the gNB.

If after RV5 the gNB has still not received an ACK on PUCCH, it recommences with transmission of SYS1, SYS2 etc. which are transmitted in the first repeated transmission of the URLLC packet.

The transmission scheme described has the benefit of reducing a total amount of re-transmitted resource from the gNB, as compared to the example shown in FIG. 8.

Although the above mentioned example embodiments have been described with reference to a UE receiving a URLLC packet, it will be appreciated that embodiments of the present technique find application equally with the uplink as well as the downlink, so that the receiver operation described with reference to a UE can be equally applied in an infrastructure equipment of a wireless communications network.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and samples of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various further aspects and features of the present invention are defined in the following numbered paragraphs:

Paragraph 1: A communications device configured to receive data from a wireless communications network, the communications device comprising receiver circuitry configured to receive signals transmitted via a wireless access interface provided by the wireless communications network, transmitter circuitry configured to transmit signals via the wireless access to the wireless communications network, and controller circuitry configured to control the transmitter circuitry and the receiver circuitry to receive the data represented as signals from the wireless access interface in accordance with an automatic repeat request, ARQ, type protocol in which the data is received as a plurality of encoded data packets, the encoded data packets having been encoded with an error correction code and the transmitter circuitry is configured to transmit a feedback signal depending on whether each of the encoded data packets is estimated as having been decoded successfully by the receiver circuitry, wherein the controller circuitry is configured to evaluate a quality measure of each encoded data packet and in response to the evaluated quality measure to transmit an early indication of the feedback signal to the wireless communications network, before the encoded data packet has been decoded by the receiver circuitry.

Paragraph 2. A communications device according to paragraph 1, wherein the controller circuitry is configured to transmit the early indication of the feedback signal to the wireless communications network in response to at least one of a re-evaluation of the quality measure or an evaluation of one or more other quality measures of the encoded data packet.

Paragraph 3. A communications device according to paragraph 2, wherein the quality measure and the one or more other quality measures are generated from the same or different processes of the receiver circuitry.

Paragraph 4. A communications device according to paragraph 1, 2 or 3, wherein each encoded data packet is received as a first signal component transmitted in control channel resources (PDCCH) and a second signal component transmitted within shared channel resources (PDSCH) of the wireless access interface, the first signal component transmitted in the control channel carrying information for decoding or recovering the data from the encoded data packet transmitted in the shared channel representing the encoded data packet, and the evaluated quality measure is based on an estimate of whether the information for decoding or recovering the data from the encoded data packet can be detected by the receiver circuitry.

Paragraph 5. A communications device according to paragraph 4, wherein the information carried by the first signal component transmitted in the control channel is a downlink control indication which includes an indication of the information for decoding or recovering the data carried by the encoded data packet, and the controller circuitry is configured to generate the early indication of the feedback signal based on whether the downlink control indication can be determined by the receiver circuitry.

Paragraph 6. A communications device according to any of paragraphs 1 to 5, wherein the receiver circuitry includes a channel estimator, which generates an estimate of a channel through which the received signals carrying the encoded data packet have passed, and the controller circuitry is configured to generate the quality measure based on an evaluation of the channel estimate.

Paragraph 7. A communications device according to paragraph 6, wherein the controller circuitry is configured to evaluate the channel estimate by generating an estimate of a signal to noise ratio of the received signal representing the encoded data packet from the channel estimate.

Paragraph 8. A communications device according to paragraph 6 or 7, wherein the controller circuitry is configured to generate the estimate of the signal to noise ratio by comparing received reference symbols transmitted with the signals representing the encoded data packet with a reproduction of those reference symbols known at the receiver circuitry.

Paragraph 9. A communications device according to any of paragraphs 1 to 5, wherein the receiver circuitry includes a demodulator for demodulating the symbols in the signals representing each encoded data packet to recover an estimate of the bits in each encoded data packet, and the quality measure is determined from soft decision values generated by the demodulator from the received encoded data packet which represents an estimate of each of the encoded data symbols of the received encoded data packet.

Paragraph 10. A communications device according to paragraph 7, wherein the soft decision values are formed as log likelihood ratios (LLRs).

Paragraph 11. A communications device according to any of paragraphs 1 to 5, wherein the receiver circuitry includes an error correction decoder which is configured to generate an estimate of the data packet by decoding the data packet in accordance with an error correction encoding applied to the data packet at the transmitter, and the quality measure is generated from a metric generated as part of the decoding process performed by the decoder.

Paragraph 12. A communications device according to any of paragraphs 1 to 11, wherein the controller circuitry is configured to evaluate the quality measure and consequent upon the evaluation either to generate an early indication that the data unit will not be successfully decoded as a negative acknowledgement (NACK), or to generate an early indication that the data unit will be successfully decoded as an acknowledgement (ACK), and to transmit the early indication using the transmitter circuitry to the wireless communications network for the wireless communications network to adapt the transmission of the encoded data packet to reduce an amount of time required to transmit the encoded data unit.

Paragraph 13. An infrastructure equipment configured to form part of a radio access network of a wireless communications network for receiving data from a communications devices co-operating with the wireless communications network, the infrastructure equipment comprising receiver circuitry configured to receive signals transmitted, by the communications device, via a wireless access interface formed by the infrastructure equipment, transmitter circuitry configured to transmit signals via the wireless access to the communications device, and controller circuitry configured to control the transmitter circuitry and the receiver circuitry to receive the data represented as signals from the wireless access interface in accordance with an automatic repeat request, ARQ, type protocol in which the data is received as a plurality of encoded data packets, the encoded data packets having been encoded with an error correction code and the transmitter circuitry is configured to transmit a feedback signal depending on whether each of the data packets is estimated as having been decoded successfully by the receiver circuitry, wherein the controller circuitry is configured to evaluate a quality measure of each encoded data packet and in response to the evaluated quality measure to transmit an early indication of the feedback signal to the wireless communications network, before the encoded data packet has been decoded by the error correction decoder.

Paragraph 14. An infrastructure equipment according to paragraph 13, wherein the controller circuitry is configured to transmit the early indication of the feedback signal to the wireless communications network in response to at least one of a re-evaluation of the quality measure or an evaluation of one or more other quality measures of the encoded data packet.

Paragraph 15. An infrastructure equipment according to paragraph 14, wherein the quality measure and the one or more other quality measures are generated from the same or different processes of the receiver circuitry.

Paragraph 16. A method of communicating data from a wireless communications network to a communications device, the method comprising receiving signals representing the data at the communications device transmitted via a wireless access interface provided by the wireless communications network in accordance with an automatic repeat request, ARQ, type protocol in which the data is received as a plurality of encoded data packets, the encoded data packets having been encoded with an error correction code, and in response transmitting a feedback signal depending on whether each of the data packets is estimated as having been decoded successfully by the receiver circuitry, wherein the receiving each of the plurality of encoded data packets comprises evaluating a quality measure of each encoded data packet, and in response to the evaluated quality measure, transmitting an early indication of the feedback signal to the wireless communications network, before the encoded data packet has been decoded by the error correction decoder.

Paragraph 17. A method of communicating data from a communications device to a wireless communications network, the method comprising receiving signals representing the data at the communications device transmitted via a wireless access interface provided by the wireless communications network in accordance with an automatic repeat request, ARQ, type protocol in which the data is received as a plurality of encoded data packets, the encoded data packets having been encoded with an error correction code, and in response transmitting a feedback signal depending on whether each of the data packets is estimated as having been decoded successfully by the receiver circuitry, wherein the receiving each of the plurality of encoded data packets comprises evaluating a quality measure of each encoded data packet, and in response to the evaluated quality measure, transmitting an early indication of the feedback signal to the wireless communications network, before the encoded data packet has been decoded by the error correction decoder.

Paragraph 18. A communications device configured to receive data from a wireless communications network, the communications device comprising receiver circuitry configured to receive signals transmitted via a wireless access interface provided by the wireless communications network, transmitter circuitry configured to transmit signals via the wireless access to the wireless communications network, and controller circuitry configured to control the transmitter circuitry and the receiver circuitry to receive the data represented as signals from the wireless access interface in accordance with an automatic repeat request, ARQ, type protocol in which the data is received as one or more encoded data packets, the encoded data packets having been encoded with an error correction code and the transmitter circuitry is configured to transmit a feedback signal depending on whether each of the encoded data packets is estimated as having been decoded successfully or unsuccessfully by the receiver circuitry in accordance with the ARQ type protocol, and the encoded data packet is transmitted using a plurality of Orthogonal Frequency Division Multiplexed, OFDM, symbols, each of which is formed by a plurality of modulation symbols carried by a corresponding plurality of sub-carrier signals of the wireless access interface and each OFDM symbol carries encoded data symbols of the encoded data packet, the plurality of OFDM symbols being transmitted repeatedly, and the controller circuitry is configured in combination with the receiver circuitry to combine information received from an encoded data packet from one or more of the repeatedly transmitted OFDM symbols of the encoded data packet, to determine from the combination of the information received from the repeatedly transmitted OFDM symbols whether the data carried by the encoded data packet can be successfully decoded, and depending on whether the data carried by each encoded data packet can be successfully decoded or not in accordance with the ARQ protocol, to control the transmitter circuitry to transmit the feedback signal.

Paragraph 19. A communications device according to paragraph 18, wherein the encoded data packet is transmitted repeatedly by the repeated transmission of the OFDM symbols representing the encoded data packet, and each of the repeatedly transmitted OFDM symbols provides different parity symbols of the encoded data packet.

Paragraph 20. A communications device according to paragraph 18 or 19, wherein the data carried by each of the encoded data packets has been encoded using a systematic error correction code, and the OFDM symbols carrying each repeated transmission of the encoded data packet carries systematic symbols of the encoded data packet, which are transmitted first and parity symbols of the encoded data packet are transmitted second after the systematic symbols, and the controller circuitry is configured to determine whether the encoded data packet can be decoded based on only information of the systematic symbols, so that a feedback signal can be transmitted based only on the systematic symbols.

Paragraph 21. A communications device according to paragraph 20, wherein the controller circuitry is configured in combination with the receiver circuitry to determine for each combination of information received from the one or more OFDM symbols whether the data carried by the encoded data packet can be successfully decoded by combining the systematic symbols of the encoded data packet from the one or more OFDM symbols carrying the systematic symbols from at least one repeated transmission of the OFDM symbols carrying the systematic symbols, if the encoded data packet cannot be successfully decoded from the information received from the systematic symbols and the parity symbols representing the encoded data packet.

Paragraph 22. A communications device according to any of paragraphs 18 to 21, wherein the encoded data packet is transmitted as a sequence of the OFDM symbols carrying the systematic symbols first and the parity symbols second.

Paragraph 22. A communications device according to paragraph 22, wherein the sequence OFDM symbols representing each encoded data packet is transmitted a predetermined number of times up to a predetermined maximum scheduled number, unless the feedback signal indicates that the encoded data packet can be successfully decoded.

Paragraph 24. A communications device according to paragraph 22, wherein the sequence OFDM symbols representing each encoded data packet is transmitted until the feedback signal indicates that the encoded data packet can be successfully decoded.

Paragraph 25. A communications device according to any of paragraphs 18 to 24, wherein the feedback signal transmitted in accordance with the ARQ protocol represents either an indication that the data unit has been successfully decoded as an acknowledgement (ACK), in response to which the wireless communications network can stop transmitting the successive OFDM symbols carrying the encoded data packet, or an indication that the data unit has not been successfully decoded as a negative acknowledgement (NACK), in response to which the wireless communications network can continue to transmit the encoded data packet.

REFERENCES

[1] Holma H. and Toskala A [1] ISBN 9780470-319338 Fourth edition, 2007 Chapter 5

[2] EN 302 755 v1.3.1, 'Framing structure, channel coding and modulation for a second generation digital terrestrial television broadcasting system (DVB-T2)', ETSI, April 2012.

[3] RP-160671, "New SID Proposal: Study on New Radio Access Technology," NTT DOCOMO, RAN#71

Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

The invention claimed is:

1. An infrastructure equipment configured to form part of a radio access network of a wireless communications network for receiving data from a communications devices co-operating with the wireless communications network, the infrastructure equipment comprising receiver circuitry configured to receive signals transmitted, by the communications device, via a wireless access interface formed by the infrastructure equipment, transmitter circuitry configured to transmit signals via the wireless access to the communications device, and controller circuitry configured to control the transmitter circuitry and the receiver circuitry to:

receive the data represented as signals from the wireless access interface in accordance with an automatic repeat request, ARQ, type protocol in which the data is received as one or more encoded data packets, the encoded data packets having been encoded with an error correction code and the transmitter circuitry is configured to transmit a feedback signal depending on whether each of the encoded data packets is estimated as having been decoded successfully or unsuccessfully by the receiver circuitry in accordance with the ARQ type protocol, and the encoded data packet is transmitted using a plurality of Orthogonal Frequency Division Multiplexed, OFDM, symbols, each of which is formed by a plurality of modulation symbols carried by a corresponding plurality of sub-carrier signals of the wireless access interface and each OFDM symbol carries encoded data symbols of the encoded data packet, the plurality of OFDM symbols being transmitted repeatedly, and the controller circuitry is configured in combination with the receiver circuitry;

combine information received from an encoded data packet from one or more of the repeatedly transmitted OFDM symbols of the encoded data packet;

determine from the combination of the information received from the repeatedly transmitted OFDM symbols whether the data carried by the encoded data packet can be successfully decoded; and depending on whether the data carried by each encoded data packet can be successfully decoded or not in accordance with the ARQ protocol, control the transmitter circuitry to transmit the feedback signal.

2. An infrastructure equipment as claimed in claim 1, wherein the encoded data packet is transmitted repeatedly by the repeated transmission of the OFDM symbols representing the encoded data packet, and each of the repeatedly transmitted OFDM symbols provides different parity symbols of the encoded data packet.

3. A method of communicating data from a wireless communications network to a communications device, the method comprising:

receiving the data represented as signals from the wireless access interface in accordance with an automatic repeat request, ARQ, type protocol in which the data is received as one or more encoded data packets, the encoded data packets having been encoded with an error correction code and the transmitter circuitry is configured to transmit a feedback signal depending on whether each of the encoded data packets is estimated as having been decoded successfully or unsuccessfully by the receiver circuitry in accordance with the ARQ type protocol, and the encoded data packet is transmitted using a plurality of Orthogonal Frequency Division Multiplexed, OFDM, symbols, each of which is formed by a plurality of modulation symbols carried by a corresponding plurality of sub-carrier signals of the wireless access interface and each OFDM symbol carries encoded data symbols of the encoded data packet, the plurality of OFDM symbols being transmitted repeatedly;

combining information received from an encoded data packet from one or more of the repeatedly transmitted OFDM symbols of the encoded data packet;

determining from the combination of the information received from the repeatedly transmitted OFDM symbols whether the data carried by the encoded data packet can be successfully decoded; and depending on whether the data carried by each encoded data packet can be successfully decoded or not in accordance with the ARQ protocol, transmitting the feedback signal.

4. A method of communicating data from a communications device to a wireless communications network, the method comprising:

receiving the data represented as signals from the wireless access interface in accordance with an automatic repeat request, ARQ, type protocol in which the data is received as one or more encoded data packets, the encoded data packets having been encoded with an error correction code and the transmitter circuitry is configured to transmit a feedback signal depending on whether each of the encoded data packets is estimated as having been decoded successfully or unsuccessfully by the receiver circuitry in accordance with the ARQ type protocol, and the encoded data packet is transmitted using a plurality of Orthogonal Frequency Division Multiplexed, OFDM, symbols, each of which is formed by a plurality of modulation symbols carried by a corresponding plurality of sub-carrier signals of the wireless access interface and each OFDM symbol carries encoded data symbols of the encoded data packet, the plurality of OFDM symbols being transmitted repeatedly;

combining information received from an encoded data packet from one or more of the repeatedly transmitted OFDM symbols of the encoded data packet;

determining from the combination of the information received from the repeatedly transmitted OFDM symbols whether the data carried by the encoded data packet can be successfully decoded; and depending on whether the data carried by each encoded data packet can be successfully decoded or not in accordance with the ARQ protocol, transmitting the feedback signal.

* * * * *